United States Patent
Miyazaki

(10) Patent No.: US 10,202,503 B2
(45) Date of Patent: Feb. 12, 2019

(54) RUBBER COMPOSITION FOR BASE TREAD

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 80 days.

(21) Appl. No.: 14/217,898

(22) Filed: Mar. 18, 2014

(65) Prior Publication Data

US 2014/0296421 A1    Oct. 2, 2014

(30) Foreign Application Priority Data

Mar. 28, 2013 (JP) ................. 2013-069402

(51) Int. Cl.
| | | |
|---|---|---|
| *C08L 7/00* | (2006.01) | |
| *C08L 15/00* | (2006.01) | |
| *C08L 21/00* | (2006.01) | |
| *B60C 1/00* | (2006.01) | |
| *C08C 19/44* | (2006.01) | |

(52) U.S. Cl.
CPC .............. *C08L 7/00* (2013.01); *B60C 1/0016* (2013.01); *C08L 15/00* (2013.01); *C08L 21/00* (2013.01); *C08C 19/44* (2013.01); *C08L 2205/03* (2013.01); *Y02T 10/862* (2013.01)

(58) Field of Classification Search
CPC .. C08L 7/00; C08L 15/00; C08L 21/00; C08L 9/00; C08L 2205/03; B60C 1/0016; C08K 3/36; C08C 19/44; Y01T 10/862; Y02T 10/862
USPC ........................................................ 524/526
See application file for complete search history.

(56) References Cited

U.S. PATENT DOCUMENTS

| | | | |
|---|---|---|---|
| 7,393,902 B2 | 7/2008 | Miyazaki | |
| 2006/0276583 A1* | 12/2006 | Miyazaki ................. | C08K 3/36 524/574 |
| 2010/0048799 A1* | 2/2010 | Miyazaki ................. | B60C 1/00 524/526 |
| 2010/0071827 A1 | 3/2010 | Miyazaki | |
| 2010/0224299 A1 | 9/2010 | Miyazaki | |
| 2012/0053263 A1 | 3/2012 | Miyazaki | |
| 2014/0011944 A1 | 1/2014 | Kondo | |

FOREIGN PATENT DOCUMENTS

| | | | |
|---|---|---|---|
| JP | 59122531 A | * | 7/1984 |
| JP | 2007284554 A | * | 11/2007 |
| JP | 4402566 B2 | | 1/2010 |
| JP | 2010-95705 A | | 4/2010 |
| JP | 2010084059 A | * | 4/2010 |
| JP | 4510778 B2 | | 7/2010 |
| JP | 2011-153259 A | | 8/2011 |
| JP | 2012-250495 A | | 12/2012 |
| WO | WO 2012/165038 A1 | | 12/2012 |

OTHER PUBLICATIONS

Rodgers et al., "Rubber Compounding- 6. Processing Agents," Encyclopedia of Polymer Science & Technology, vol. 11, pp. 643-644, John Wiley & Sons (published online Jul. 15, 2004).*
JP 2007-284554 A (2007), machine translation. JPO/INPIT Japan Platform for Patent Information (J-PlatPat).*
"Struktol WB16: Lubricant Process Additive," technical data sheet [online], Struktol Company of America, [retrieved on Mar. 25, 2016]. Retrieved from the Internet: <URL: www.struktol.com/pdfs/SB16.pdf>, published Jan. 27, 2012.*
JP 2010-084059 A (2010), machine translation, JPO Japan Platform for Patent Information (J-PlatPat).*
JP 59122531 A, machine translation, JPO Japan Platform for Patent Information (J-PlatPat). (Year: 1984).*
Search Report dated Jun. 24, 2014 for European Application No. 14 16 1833.
Japanese Office Action, dated Sep. 27, 2016, for Japanese Application No. 2013-069402, along with an English translation.
Japanese Office Action for Japanese Application No. 2013-069402, dated Dec. 20, 2016, with an English translation.

* cited by examiner

*Primary Examiner* — Josephine L Chang
(74) *Attorney, Agent, or Firm* — Birch, Stewart, Kolasch & Birch, LLP

(57) ABSTRACT

Provided is a rubber composition for base tread which can improve steering stability, rolling resistance and durability without deteriorating extrusion processability, comprising 1.8 to 3.5 parts by mass of sulfur and 36 to 60 parts by mass of filler for reinforcement comprising not less than 7 parts by mass of silica based on 100 parts by mass of a rubber component comprising:
(a) not less than 0% by mass and not more than 20% by mass of (a1) a polybutadiene rubber comprising 2.5 to 20% by mass of 1,2-syndiotactic polybutadiene crystal and/or (a2) a butadiene rubber synthesized with a rare earth containing catalyst; (b) more than 5% by mass and not more than 60% by mass of (b1) a predetermined tin-modified polybutadiene rubber and/or (b2) a modified butadiene rubber modified with a predetermined compound; and (c) 40 to 75% by mass of a diene rubber other than (a) and (b).

8 Claims, No Drawings

RUBBER COMPOSITION FOR BASE TREAD

TECHNICAL FIELD

The present invention relates to a rubber composition for a base tread.

BACKGROUND OF THE INVENTION

Various means for improving rolling resistance of a tire to improve energy conservation, and for improving steering stability of a vehicle have been proposed. One of such means is to make a tread of a tire with a two-layered structure (inner layer and outer layer) and use a rubber composition, which is excellent in rolling resistance and steering stability, for a base tread that is the inner layer.

JP 4402566 B and JP 4510778 B describe that a rubber composition for a base tread which is excellent in steering stability and rolling resistance can be obtained by using a rubber component comprising: (a) 20 to 60% by weight of a polybutadiene rubber comprising 2.5 to 20% by weight of 1,2-syndiotactic polybutadiene crystal; (b) 5 to 80% by weight of a tin-modified polybutadiene rubber prepared by polymerization with a lithium initiator and having a content of tin atoms of 50 to 3,000 ppm, a vinyl bond amount of 5 to 50% by weight and a molecular weight distribution (Mw/Mn) of not more than 2.0; and (c) 10 to 75% by weight of a rubber other than (a) and (b). However, for achieving a good balance among steering stability, rolling resistance and durability, there is room for improvement.

SUMMARY OF THE INVENTION

An object of the present invention is to provide a rubber composition for a base tread which can improve steering stability, rolling resistance and durability without deteriorating extrusion processability.

The present invention relates to a rubber composition for a base tread comprising 1.8 to 3.5 parts by mass of sulfur and 36 to 60 parts by mass of a filler for reinforcement comprising not less than 7 parts by mass of silica, based on 100 parts by mass of a rubber component comprising: (a) not less than 0% by mass and not more than 20% by mass of (a1) a polybutadiene rubber comprising 2.5 to 20% by mass of 1,2-syndiotactic polybutadiene crystal and/or (a2) a butadiene rubber synthesized with a rare earth containing catalyst; (b) more than 5% by mass and not more than 60% by mass of (b1) a tin-modified polybutadiene rubber prepared by polymerization with a lithium initiator and having a content of tin atoms of 50 to 3000 ppm, a vinyl bond amount of 5 to 50% by mass and a molecular weight distribution (Mw/Mn) of not more than 2.0 and/or (b2) a modified butadiene rubber modified with a compound represented by the following formula (1); and (c) 40 to 75% by mass of a diene rubber other than (a) and (b).

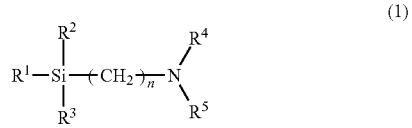

(1)

In the formula (1), $R^1$, $R^2$ and $R^3$ are the same or different, and each represents an alkyl, alkoxy, silyloxy, acetal, carboxyl, or mercapto group or derivatives thereof; $R^4$ and $R^5$ are the same or different, and each represents a hydrogen atom or an alkyl group and may be bonded to each other to form a ring structure with a nitrogen atom; and n represents an integer.

It is preferable that the content of the rubber component (a) is not less than 10% by mass and less than 20% by mass and the content of the rubber component (b) is more than 5% by mass and not more than 50% by mass.

It is preferable that the rubber composition comprises 2.5 to 6.0 parts by mass of at least one selected from the group consisting of: stearic acid; a metal salt of saturated fatty acid; and a mold release agent comprising at least one selected from the group consisting of a metal salt of fatty acid, a fatty acid amide and an amide ester based on 100 parts by mass of the rubber component.

It is preferable that the rubber composition for a base tread is produced with a production method including three or more kneading steps.

The present invention provides a rubber composition for a base tread comprising a predetermined rubber component, sulfur and a predetermined filler for reinforcement in predetermined amounts, and being able to improve steering stability, rolling resistance and durability without deteriorating extrusion processability.

DETAILED DESCRIPTION

The rubber composition for a base tread of the present invention comprises a predetermined rubber component, sulfur and a predetermined filler for reinforcement in predetermined amounts.

The rubber component comprises a rubber component (a): a polybutadiene rubber comprising 1,2-syndiotactic polybutadiene crystal (rubber component (a1)) and/or a butadiene rubber synthesized with a rare earth containing catalyst (rubber component (a2)), a rubber component (b): a tin-modified polybutadiene rubber (rubber component (b1)) and/or a modified butadiene rubber modified with a predetermined compound (rubber component (b2)) and a rubber component (c): a rubber other than the rubber components (a) and (b).

It is preferable that the polybutadiene rubber comprising 1,2-syndiotactic polybutadiene crystal (SPB-containing BR), which is the rubber component (a1), is not the one in which 1,2-syndiotactic polybutadiene crystal (SPB) is merely dispersed in the BR, but the one in which 1,2-syndiotactic polybutadiene crystal (SPB) is chemically bonded with the BR and dispersed without orientation. Due to the crystal being chemically bonded with the BR and dispersed, generation and propagation of a crack tend to be suppressed.

The melting point of the SPB is preferably not less than 180° C., more preferably not less than 190° C. When the melting point of the SPB is less than 180° C., there is a tendency that the crystal is melted during vulcanization of a tire by pressing and the hardness of the composition is decreased. On the other hand, the melting point of the SPB is preferably not more than 220° C., more preferably not more than 210° C. When the melting point of the SPB is more than 220° C., there is a tendency that the dispersibility in the rubber composition is deteriorated due to the increase of the molecular weight of the rubber component (a1).

The content of a boiling n-hexane insoluble matter in the SPB-containing BR is preferably not less than 2.5% by mass, more preferably not less than 8% by mass. When the content of the boiling n-hexane insoluble matter is less than 2.5% by mass, the hardness of the rubber composition tends to be insufficient. On the other hand, the content of the boiling n-hexane insoluble matter is preferably not more than 22% by mass, more preferably not more than 20% by mass, further preferably not more than 18% by mass. When the content of the boiling n-hexane insoluble matter exceeds 22% by mass, the viscosity of the SPB-containing BR itself becomes high and there is a tendency that the dispersibility of the SPB-containing BR and a filler for reinforcement in the rubber composition deteriorates. Here, the boiling n-hexane insoluble matter indicates 1,2-syndiotactic polybutadiene (SPB) in the SPB-containing BR.

The content of the SPB in the SPB-containing BR is preferably not less than 2.5% by mass, more preferably not less than 10% by mass. When the content of the SPB is less than 2.5% by mass, the hardness of the composition tends to be insufficient. Further, the content of the SPB in the SPB-containing BR is not more than 20% by mass, preferably not more than 18% by mass. When the content of the SPB exceeds 20% by mass, the SPB-containing BR becomes difficult to be dispersed in the rubber composition and the extrusion processability tends to be deteriorated.

A butadiene rubber synthesized with a rare earth containing catalyst (rare-earth-metal-catalyzed BR), which is the rubber component (a2), is characterized by a high cis content and a low vinyl content. Ones generally used in the production of tires may be used as the rare-earth-metal-catalyzed BR.

Well-known ones may be used as the rare earth element containing catalyst used for the synthesis of the rare-earth-metal-catalyzed BR, and examples thereof include catalysts which comprise a lanthanoids-containing compound, an organoaluminum compound, an aluminoxane, or a halogen-containing compound, and optionally comprise a Lewis base. Among them, catalysts using the lanthanoids-containing compound are particularly preferable.

Examples of the lanthanoids-containing compound include halides, carboxylates, alcoholates, thioalcoholates, and amides of rare earth metals which have atomic numbers 57 through 71. Among them, the Nd containing catalysts are preferable since a BR having a high cis content and a low vinyl content can be obtained.

As the organoaluminum compound, compounds represented by $AlR^aR^bR^c$ (wherein $R^a$, $R^b$ and $R^c$ are the same or different, and each represents hydrogen or a hydrocarbon group having 1 to 8 carbon atoms) may be used. Examples of the aluminoxane include chain aluminoxanes and cyclic aluminoxanes. Examples of the halogen-containing compound include aluminum halides represented by $AlX_kR^d_{3-k}$ (wherein X represents halogen, $R^d$ represents an alkyl, aryl, or aralkyl group having 1 to 20 carbon atoms, and k represents 1, 1.5, 2 or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base may be used for complexing a lanthanoids-containing compound, and suitable examples thereof include acetylacetone, keton and alcohol.

In the polymerization of butadiene, the rare earth element containing catalysts may be used with being dissolved in an organic solvent (such as n-hexane, cyclohexane, n-heptane, toluene, xylene, or benzene), or with being carried on an appropriate carrier such as silica, magnesia, or magnesium chloride. The polymerization condition may be either of solution polymerization or bulk polymerization. The polymerization temperature is preferably −30 to 150° C. and the polymerization pressure may be optionally set depending on other conditions.

The ratio (Mw/Mn) of the weight-average molecular weight (Mw) to the number-average molecular weight (Mn) of the rare-earth-metal-catalyzed BR is preferably not less than 1.2, more preferably not less than 1.5. When the Mw/Mn is less than 1.2, processability tends to be deteriorated. Further, the Mw/Mn is preferably not more than 5, more preferably not more than 4. When the Mw/Mn exceeds 5, the effect of improving steering stability, rolling resistance and durability tends to decrease.

The Mw of the rare-earth-metal-catalyzed BR is preferably not less than 300,000, more preferably not less than 500,000. On the other hand, the Mw is preferably not more than 1,500,000, more preferably not more than 1,200,000. Moreover, the Mn of the rare-earth-metal-catalyzed BR is preferably not less than 100,000, more preferably not less than 150,000. On the other hand, the Mn is preferably not more than 1,000,000, more preferably not more than 800,000. If the Mw or Mn is less than its preferable lower limit, steering stability, rolling resistance, durability and elongation at break tend to deteriorate. On the other hand, if the Mw or Mn is more than its preferable upper limit, deterioration of processability becomes a concern. In the present invention, the weight-average molecular weight (Mw) and the number-average molecular weight (Mn) can be calculated with polystyrene standards based on the measured value obtained using a gel permeation chromatography (GPC) (GPC-8000 series manufactured by Tosoh Corporation, detector: differential refractometer, column: TSKGEL SUPERMALTPORE HZ-M manufactured by Tosoh Corporation).

The cis content of the rare-earth-metal-catalyzed BR is preferably not less than 90% by mass, more preferably not less than 93% by mass, further preferably not less than 95% by mass. If the content is less than 90% by mass, steering stability, rolling resistance, durability and elongation at break may be deteriorated. It is noted that the cis content can be determined by infrared absorption spectrum analysis.

The vinyl content of the rare-earth-metal-catalyzed BR is preferably not more than 1.8% by mass, more preferably not more than 1.0% by mass. If the content exceeds 1.8% by mass, steering stability, durability and elongation at break may be deteriorated. It is noted that the vinyl content can be determined by infrared absorption spectrum analysis.

The content of the rubber component (a) in the rubber component is less than 20% by mass, preferably not more than 19% by mass, more preferably not more than 18% by mass. If the content of the rubber component (a) is not less than 20% by mass, heat build-up property and elongation at break tend to be deteriorated. Further, though the content of the rubber component (a) in the rubber component can be 0% by mass, in view of more excellent dispersibility of silica and extrusion processability, the content is preferably not less than 10% by mass, more preferably not less than 12% by mass.

The rubber component (b1) is a tin-modified polybutadiene rubber (tin-modified BR) prepared by polymerization with a lithium initiator and having a content of tin atoms of 50 to 3,000 ppm, a vinyl bond amount of 5 to 50% by mass and a molecular weight distribution (Mw/Mn) of not more than 2.0. A preferable example of this tin-modified BR is a tin-modified polybutadiene rubber obtained by performing polymerization of 1,3-butadiene with a lithium initiator and then adding a tin compound, and further having the terminal of the modified BR molecules bonded with a tin-carbon bond.

Examples of the lithium initiator include lithium or lithium compounds such as an alkyllithium, an aryllithium, an allyllithium, a vinyllithium, an organotin lithium and an organonitrogen lithium compound. By using lithium or a lithium compound as the initiator, a tin-modified BR having a high vinyl content and a low cis content can be produced.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene and these tin compounds may be used alone, or may be used in combination with two or more thereof.

The content of tin atoms in the tin-modified BR is not less than 50 ppm, preferably not less than 60 ppm. When the content of tin atoms is less than 50 ppm, the effect of accelerating the dispersion of a filler for reinforcement in the tin-modified BR tends to be small and additionally, the tan δ tends to increase. Further, the content of tin atoms is not more than 3,000 ppm, preferably not more than 2,500 ppm, more preferably not more than 250 ppm. When the content of tin atoms exceeds 3,000 ppm, cohesiveness of the kneaded product tends to be poor, the edges thereof tend not to be aligned, and therefore extrusion processability of the kneaded product tends to deteriorate.

The molecular weight distribution (Mw/Mn) of the tin-modified BR is not more than 2.0, preferably not more than 1.5. When the Mw/Mn exceeds 2.0, the dispersibility of a filler for reinforcement tends to deteriorate and the tan δ tends to increase. It is noted that the lower limit of the molecular weight distribution is not particularly limited, but preferably not less than 1.

The vinyl bond amount of the tin-modified BR is not less than 5% by mass, preferably not less than 7% by mass. It is difficult to polymerize (produce) a tin-modified BR having a vinyl bond amount of less than 5% by mass. Further, the vinyl bond amount of the tin-modified BR is not more than 50% by mass, preferably not more than 20% by mass. When the vinyl bond amount of the tin-modified BR exceeds 50% by mass, there is a tendency that the dispersibility of a filler for reinforcement is deteriorated and the tan δ is increased.

The rubber component (b2) is a modified butadiene rubber (S-modified BR) modified with a compound represented by the following formula (1).

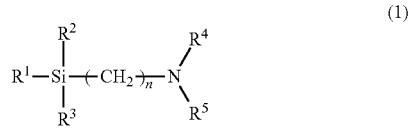

(1)

In the formula (1), $R^1$, $R^2$ and $R^3$ are the same or different, and each represents an alkyl, alkoxy, silyloxy, acetal, carboxyl, or mercapto group or derivatives thereof; $R^4$ and $R^5$ are the same or different, and each represents a hydrogen atom or an alkyl group and may be bonded to each other to form a ring structure with a nitrogen atom; and n represents an integer.

Since excellent rolling resistance and breaking resistance can be obtained, $R^1$, $R^2$ and $R^3$ in the formula (1) are preferably an alkoxy group, more preferably an alkoxy group having 1 to 8 carbon atoms and further preferably an alkoxy group having 1 to 4 carbon atoms. The alkoxy group also includes a cycloalkoxy group (such as a cyclohexyloxy group) and an aryloxy group (such as a phenoxy group or a benzyloxy group). Further, since the effect of the present invention can be successfully obtained, $R^4$ and $R^5$ are preferably an alkyl group and more preferably an alkyl group having 1 to 3 carbon atoms.

Since the effect of the present invention can be successfully obtained, n in the formula (1) is preferably an integer of 1 to 5, more preferably an integer of 2 to 4 and further preferably 3. Moreover, in the case where $R^4$ and $R^5$ are bonded to each other to form a ring structure with a nitrogen atom, a 4- to 8-membered ring is preferable.

Specific examples of the compounds represented by the formula (1) include 2-dimethylaminoethyl trimethoxysilane, 3-dimethylaminopropyl trimethoxysilane, 2-dimethylaminoethyl triethoxysilane, 3-dimethylaminopropyl triethoxysilane, 2-diethylaminoethyl trimethoxysilane, 3-diethylaminopropyl trimethoxysilane, 2-diethylaminoethyl triethoxysilane and 3-diethylaminopropyl triethoxysilane. Among them, 3-dimethylaminopropyl trimethoxysilane, 3-dimethylaminopropyl triethoxysilane and 3-diethylaminopropyl trimethoxysilane are preferable since the effect of the invention can be successfully exerted. These compounds may be used alone, or may be used in combination with two or more thereof.

For modification of the butadiene rubber using the compound (a modifying agent) represented by the formula (1), well-known methods as described in such as JP 6-053768 B and JP 6-057767 B may be used. For example, a butadiene rubber can be modified by being contacted with the compound, and one specific example is a modification method of preparing a butadiene rubber by anion polymerization and then adding a predetermined amount of the compound into the rubber solution to react the terminal (active terminal) of the polymerized butadiene rubber with the compound.

The content of the rubber component (b) in the rubber component is more than 5% by mass, preferably not less than 7% by mass, more preferably not less than 10% by mass. If the content of the rubber component (b) is not more than 5% by mass, rolling resistance tends not to be improved enough. On the other hand, the content of the rubber component (b) in the rubber component is not more than 60% by mass, preferably not more than 50% by mass, more preferably not more than 45% by mass. If the content of the rubber component (b) exceeds 60% by mass, extrusion processability and elongation at break tend to deteriorate.

The rubber component (c) is a diene rubber other than the rubber component (a) and the rubber component (b). Examples of the rubber component (c) include a natural rubber (NR), a deproteinized natural rubber (DPNR), a high purity natural rubber (HPNR), an epoxidized natural rubber (ENR), an isoprene rubber (IR), a solution-polymerized styrene-butadiene rubber (S-SBR), an emulsion-polymerized styrene-butadiene rubber (E-SBR), modified styrene-butadiene rubbers (modified S-SBR, modified E-SBR) and high cis-1,4-polybutadiene rubbers other than the rubber component (a) and the rubber component (b). Among them, a modified S-SBR and ENR are preferable in view of excellent elongation at break and rolling resistance thereof. Also, E-SBR is preferable in view of excellent steering stability and elongation at break thereof. Moreover, NR and HPNR are preferable in view of excellent steering stability, elongation at break and rolling resistance thereof. These rubber components (c) may be used alone, or may be used in combination with two or more thereof.

The content of the rubber component (c) in the rubber component is not less than 40% by mass, preferably not less than 45% by mass, more preferably not less than 50% by mass. If the content of the rubber component (c) is less than 40% by mass, sufficient durability, elongation at break and steering stability tend not to be obtained. On the other hand, the content of the rubber component (c) in the rubber component is not more than 75% by mass, preferably not more than 73% by mass, more preferably not more than 71% by mass. If the content of the rubber component (c) exceeds 75% by mass, the contents of the rubber components (a) and (b) become small and steering stability, elongation at break and durability tend to become insufficient.

Insoluble sulfur commonly used in the rubber industry can be suitably used as sulfur.

The content of sulfur is not less than 1.8 parts by mass, preferably not less than 2.4 parts by mass based on 100 parts by mass of the rubber component. If the content of sulfur is less than 1.8 parts by mass, sufficient hardness tends not to be obtained and additionally, sulfur of a rubber composition for covering cords of a jointless band or steel breaker adjoining the base tread flows into the base tread and cord adhesive tends to be deteriorated due to the lack of sulfur in the rubber composition for covering cords. On the other hand, the content of sulfur is not more than 3.5 parts by mass, preferably not more than 2.9 parts by mass. If the content of sulfur exceeds 3.5 parts by mass, there is a tendency that sulfur flows to the cap tread adjoining the base tread and the cap tread is hardened, which causes a crack in the tread or groove, thereby deteriorating durability and increasing rolling resistance. It is noted that if insoluble sulfur is used as sulfur, the content thereof is a content of pure sulfur except an oil content.

The filler for reinforcement comprises a predetermined amount of silica. With the predetermined amount of silica, the elongation at break and tan δ can be improved. Examples of silica include dry processed silica (anhydrous silica) and wet processed silica (hydrous silica) and due to a large number of silanol groups and low cost, wet processed silica is preferable.

The BET specific surface area (BET) of silica is preferably 50 to 300 $m^2/g$, more preferably 80 to 250 $m^2/g$. If the BET of the silica is less than 50 $m^2/g$, elongation at break and durability tend to deteriorate. On the other hand, if the BET of the silica exceeds 300 $m^2/g$, the tan δ tends to increase. It is noted that the BET specific surface area of the silica is the value measured with the BET method according to ASTM D3037-81.

The content of the silica based on 100 parts by mass of the rubber component is not less than 7 parts by mass, preferably not less than 10 parts by mass, more preferably not less than 12 parts by mass. If the content of the silica is less than 7 parts by mass, the effect obtained by the use of silica tends to be insufficient. On the other hand, the content of the silica is preferably not more than 60 parts by mass, more preferably not more than 55 parts by mass. If the content of the silica exceeds 60 parts by mass, there is a tendency that extrusion processability is deteriorated and the tan δ is increased.

The rubber composition may also comprise fillers for reinforcement other than silica. Examples of fillers other than silica include carbon black, calcium carbonate, clay, alumina, aluminum hydroxide and talc. Among them, carbon black is preferable due to its excellent reinforcing property and crack growth resistance.

The BET specific surface area (BET) of carbon black is preferably 20 to 120 $m^2/g$, more preferably 30 to 100 $m^2/g$. If the BET of the carbon black is less than 20 $m^2/g$, reinforcing property and crack growth resistance tend not be improved enough. On the other hand, if the BET exceeds 120 $m^2/g$, rolling resistance tends to deteriorate. It is noted that the BET specific surface area of the carbon black is the value measured with the BET method according to ASTM D6556.

In the case where the rubber composition comprises carbon black, the content thereof based on 100 parts by mass of the rubber component is preferably not less than 5 parts by mass, more preferably not less than 10 parts by mass. If the content of the carbon black is less than 5 parts by mass, reinforcing property and crack growth resistance tend to deteriorate. On the other hand, the content of the carbon black is preferably not more than 40 parts by mass, more preferably not more than 35 parts by mass. If the content of the carbon black exceeds 40 parts by mass, rolling resistance and elongation at break tend to deteriorate.

The total content of fillers for reinforcement based on 100 parts by mass of the rubber component is not less than 36 parts by mass, preferably not less than 38 parts by mass, more preferably not less than 40 parts by mass. If the total content of fillers for reinforcement is less than 36 parts by mass, a molded and laminated base tread shrinks at vulcanization and residual stress is caused in the bottom of a groove in a tread portion, by which cracks tend to develop easily. On the other hand, the total content of fillers for reinforcement is not more than 60 parts by mass, preferably not more than 58 parts by mass, more preferably not more than 55 parts by mass. If the total content of fillers for reinforcement exceeds 60 parts by mass, rolling resistance tends to deteriorate. It is noted that the total content of fillers for reinforcement includes the content of the above silica.

In addition to the above rubber component, sulfur and fillers for reinforcement, the rubber composition for a base tread of the invention may also appropriately comprise compounding agents or additives conventionally used in the tire industry such as a coupling agent, a variety of oils, a softener, wax, a variety of anti-aging agents, stearic acid, a mold release agent, a vulcanization agent, a variety of vulcanization accelerators as necessary.

The rubber composition for a base tread of the invention comprises silica, and it is preferable to use a silane coupling agent therewith. Any silane coupling agents conventionally used with silica in the rubber industry can be used, and examples thereof include: sulfide silane coupling agents such as bis(3-triethoxysilylpropyl)disulfide and bis(3-triethoxysilylpropyl)tetrasulfide; mercapto silane coupling agents (mercapto group-containing silane coupling agents) such as 3-mercaptopropyltrimethoxysilane, and NXT-Z 100, NXT-Z45 and NXT produced by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone, or may be used in combination with two or more thereof. Among them, sulfide silane coupling agents and mercapto silane coupling agents are preferable in view of their strong binding force with silica and excellent heat build-up property. In addition, mercapto silane coupling agents are more preferable since they can suitably improve rolling resistance and durability.

When the rubber composition comprises a silane coupling agent, the content thereof based on 100 parts by mass of the silica is preferably not less than 6 parts by mass, more preferably not less than 7 parts by mass. If the content of the silane coupling agent is less than 6 parts by mass, dispersibility of silica tend not to be sufficiently improved. On the other hand, the content of the silane coupling agent is preferably not more than 15 parts by mass, more preferably not more than 12 parts by mass. If the content of the silane coupling agent exceeds 15 parts by mass, there is a tendency that reinforcing property is deteriorated due to insufficient coupling effect and silica dispersing effect, and cost performance gets worse.

It is preferable that the rubber composition for a base tread of the invention comprises stearic acid and/or a mold release agent, and in order to adjust a vulcanization speed and improve extrusion processability, it is preferable to use both stearic acid and a mold release agent.

When the rubber composition comprises stearic acid, the content thereof based on 100 parts by mass of the rubber component is preferably not less than 1.0 part by mass, more preferably not less than 1.5 parts by mass. If the content of stearic acid is less than 1.0 part by mass, there is a tendency that a complex elastic modulus is decreased, a tan δ is increased and steering stability is deteriorated. On the other hand, the content of stearic acid is preferably not more than 3.0 parts by mass, more preferably not more than 2.5 parts by mass. If the content of stearic acid exceeds 3.0 parts by mass, tackiness at molding tends to be deteriorated.

An example of a mold release agent is a mold release agent comprising at least one selected from the group consisting of a metal salt of fatty acid, a fatty acid amide and an amide ester. Examples of a metal in the metal salt of fatty acid include calcium, zinc, potassium and sodium. Among them, a fatty acid calcium salt is preferable since it is not expensive, does not cause environment pollution and does not affect the vulcanization speed.

Examples of the mold release agent include WB16 produced by Struktol Co., Ltd. which is a mixture of a fatty acid calcium salt and a fatty acid amide; Aflux16 produced by Rhein Chemie Corporation which is a mixture of a fatty acid calcium salt and an amide ester; and Aflux37 produced by Rhein Chemie Corporation which comprises an amide ester.

When the rubber composition comprises a mold release agent, the content thereof based on 100 parts by mass of the rubber component is preferably not less than 0.5 part by mass, more preferably not less than 1.0 part by mass. If the content of the mold release agent is less than 0.5 part by mass, mold releasing property and extrusion processability tend to be insufficient. On the other hand, the content of the mold release agent is preferably not more than 5.0 parts by mass, more preferably not more than 4.0 parts by mass. If the content of the mold release agent exceeds 5.0 parts by mass, there is a tendency that tackiness at molding and durability are deteriorated.

The total content of at least one selected from the group consisting of stearic acid, a metal salt of saturated fatty acid and a mold release agent comprising at least one selected from the group consisting of a metal salt of fatty acid, a fatty acid amide and an amide ester is preferably not less than 2.5 parts by mass, more preferably not less than 3.0 parts by mass. If the total content is less than 2.5 parts by mass, mold releasing property and extrusion processability tend to be insufficient. On the other hand, the total content is preferably not more than 6.0 parts by mass, more preferably not more than 5.0 parts by mass. If the total content exceeds 6.0 parts by mass, there is a tendency that tackiness at molding and elongation at break in the condition after oxidative degradation are deteriorated.

Moreover, by using diphenylguanidine (DPG) as a crosslinking aid, an acid silica surface is neutralized and thus a reaction between silica and a silane coupling agent during kneading or vulcanization can be accelerated.

In the case where the rubber composition comprises the DPG, the content thereof based on 100 parts by mass of the rubber component is preferably 0.1 to 3.0 parts by mass, more preferably 0.2 to 2.5 parts by mass. If the content of the DPG is less than 0.1 part by mass, the effect of the DPG for increasing a vulcanization speed and accelerating the vulcanization is difficult to be achieved. On the other hand, if the content of the DPG exceeds 3.0 parts by mass, the input of the DPG at a final kneading step dissociates the cohesion of silica-(silane coupling agent)-rubber component which was formed in a base kneading step and rolling resistance tends to be deteriorated.

The rubber composition for a base tread of the present invention can be produced with a general method. That is, the rubber composition for a base tread can be produced by kneading the aforementioned compounding agents if needed to obtain an unvulcanized rubber composition, followed by vulcanization.

Specifically, the rubber component and compounding agents (other than a crosslinking agent) such as silica, carbon black and a silane coupling agent are kneaded (base kneading step) to a compound temperature at the time of discharge from mixer of 120 to 180° C. (preferably 130 to 175° C.) and then the vulcanization agent such as sulfur is added and kneading starts at about 50° C. when a kneader is cold, or starts at about 80° C. when the kneader is continuously used and the mixture is kneaded (finish kneading step) to a compound temperature at the time of discharge from mixer of 95 to 105° C. and vulcanized to prepare the rubber composition of the invention.

It is preferable that the base kneading step is separated into two or more steps and the kneading step consists of three or more steps in total since dispersibility of silica is further improved. Specifically, the kneading step consisting of three steps of a base kneading step 1, a base kneading step 2 and a final kneading step can be achieved by separating the base kneading step into the base kneading step 1 of kneading the rubber component, a part of silica and a part of a silane coupling agent and the base kneading step 2 of adding the remaining silica and silane coupling agent and other compounding agents (other than a crosslinking agent) and kneading. Further, a kneading step consisting of four steps can be also achieved by adding a re-kneading step of again kneading the kneaded product, which was once cooled after the base kneading step 2, to a compound temperature at the time of discharge from mixer of 130 to 150° C.

By producing a pneumatic tire having a base tread comprising the rubber composition for a base tread of the invention, the pneumatic tire can have excellent steering stability, rolling resistance and durability in a good balance. The pneumatic tire can be produced by extruding an unvulcanized rubber composition of the invention into the shape of a base tread of the pneumatic tire and molding together with other tire components in a tire building machine to form an unvulcanized tire, followed by heating and pressurizing the unvulcanized tire in a vulcanizer.

EXAMPLE

Though the present invention is explained based on Examples, the present invention is not limited only thereto.

Various kinds of chemicals used in Examples and Comparative Examples are described below.

(a1) SPB-containing BR: VCR617Manufactured by Ube Industries, Ltd., (polybutadiene rubber comprising 1,2-syndiotactic polybutadiene crystal, content of 1,2-syndiotactic polybutadiene crystal (SPB): 12% by mass, melting point of SPB: 200° C., content of boiling n-hexane insoluble matter: 15 to 18% by mass)
(a2) Nd-BR: CB 25 manufactured by Lanxess AG (Nd-catalyzed BR, cis content: 97% by mass, vinyl content: 0.7% by mass, Mw/Mn: 1.78, Mw: 500,000, Mn: 280,000)
(b1) Tin-modified BR: BR1250 manufactured by Zeon Corporation (tin-modified polybutadiene rubber (tin-modified BR), prepared by polymerization using lithium as an initiator, vinyl bond amount: 10 to 13% by mass, Mw/Mn: 1.5, content of tin atom: 250 ppm)
(b2) S-modified BR: modified BR prepared in Preparation Example of S-modified BR
(c) NR: TSR20 (natural rubber)
N351H: SHOBLACK N351H manufactured by CABOT Japan K. K. (N351, BET: 68 $m^2/g$)
N550: N550 manufactured by Mitsubishi Chemical Corporation (N550, BET: 40 $m^2/g$)
VN3: ULTRASIL VN3 manufactured by Evonik Degussa GmbH (BET: 175 $m^2/g$)
U9000Gr: ULTRASIL U9000Gr manufactured by Evonik Degussa GmbH (BET: 230 $m^2/g$)
Z1085Gr: Z1085Gr manufactured by Rhodia Co., Ltd. (BET: 90 $m^2/g$)
Si75: Si75 (bis(3-triethoxysilylpropyl)disulfide) manufactured by Evonik Degussa GmbH
NXT: NXT (mercapto silane coupling agent) manufactured by Momentive Performance Materials
C5 resin: MARUKAREZ T-100AS manufactured by Maruzen Petrochemical Co., Ltd. (aliphatic petroleum resin mainly composed of olefins and diolefins in the C5 fraction obtained by naphtha cracking, softening point: 102° C.)
TDAE oil: VIVATEC 500 manufactured by H&R Co., Ltd.
C10: NOVARES 010 (liquid coumarone-indene resin, softening point: 5 to 15° C.) manufactured by Rutgers Chemicals
Zinc flower: ZINC FLOWER No. 1 manufactured by Mitsui Mining & Smelting Co., Ltd.
Mold release agent (WB16): WB16 (a mixture of fatty acid calcium salt and fatty acid amide) manufactured by Struktol Co., Ltd.
Mold release agent (Aflux16): Aflux16 (a mixture of fatty acid calcium salt and amide ester) manufactured by Rhein Chemie Corporation
Stearic acid:stearic acid manufactured by NOF Corporation
Wax: OZOACE 355 manufactured by Nippon Seiro Co., Ltd.
RD: Antage RD (Polymerized 2,2,4-trimethyl-1,2-dihydroquinoline) manufactured by Kawaguchi Chemical Industry Co., Ltd.
6PPD: Nocrac 6C (N-(1,3-dimethylbutyl)-N'-phenyl-p-phenylenediamine) manufactured by OUCHI SHINKO CHEMICAL INDUSTRIAL CO., LTD.
Insoluble sulfur (oil content: 10%): Seimi sulfur (insoluble sulfur with carbon disulfide-insoluble content of 60% or higher, oil content: 10% by mass) manufactured by NIPPON KANRYU INDUSTRY CO., LTD.
DPG: Nocceler D (1,3-Diphenylguanidine) manufactured by OUCHI SHINKO CHEMICAL INDUSTRIAL CO., LTD.
CBS: Nocceler CZ (N-cyclohexyl-2-benzothiazolylsulfenamide) manufactured by OUCHI SHINKO CHEMICAL INDUSTRIAL CO., LTD.

<Preparation Example of S-Modified BR>

To a sufficiently nitrogen-substituted pressure-resistant vessel of 30 L were added 18 L of n-hexane (manufactured by KANTO CHEMICAL CO., INC.), 2,000 g of butadiene (available from TAKACHIHO TRADING CO., LTD) and 2 mmol of tetramethylethylenediamine (manufactured by KANTO CHEMICAL CO., INC.) and the temperature was elevated to 60° C. Then, 10.3 mL of butyllithium (manufactured by KANTO CHEMICAL CO., INC.) was added and the temperature was elevated to 50° C., followed by stirring for three hours. Then, to a modifying agent (23.6 g of 3-(N,N-dimethylamino)propyltrimethoxysilane (manufactured by AZmax Co. Ltd.)) was added anhydrous hexane (manufactured by KANTO CHEMICAL CO., INC.) to obtain a mixture thereof in the total amount of 100 mL, and 11.5 mL of the mixture was poured in the vessel, followed by stirring for 30 minutes. To the reaction solution were added 15 mL of methanol (manufactured by KANTO CHEMICAL CO., INC.) and 0.1 g of 2,6-tert-butyl-p-cresol (manufactured by OUCHI SHINKO CHEMICAL INDUSTRIAL CO., LTD.) and then the reaction solution was put into a stainless steel vessel in which 18 L of methanol was contained to collect an aggregate. The obtained aggregate was dried under reduced pressure for 24 hours to obtain a S-modified BR. The Mw of the S-modified BR was 440,000 and a vinyl content thereof was 13%.

Examples 1 to 25 and Comparative Examples 1 to 13

Unvulcanized rubber compositions were obtained according to the formulation and number of kneading steps shown in Tables 1 to 5. The kneading steps will be explained below depending on the number of kneading steps. All kneading steps were conducted using a 1.7-liter Banbury mixer.

<Number of Kneading Steps: 2>

The following base kneading step and final kneading step were conducted.
Base kneading step: a step of kneading the rubber components and compounding agents other than a crosslinking agent for at least five minutes until the mixture is brought to a compound temperature at the time of discharge from mixer of 175° C. (150° C. when the mixture comprises Si75 and 165° C. when the mixture comprises NXT)
Final kneading step: a step of adding the crosslinking agent such as sulfur to the kneaded product obtained in the base kneading step and kneading the mixture for at least three minutes until the mixture is brought to a compound temperature at the time of discharge from mixer of 105° C.

<Number of Kneading Steps: 3>

The above base kneading step was separated into the following two steps and the final kneading step was further conducted.
Base kneading step 1: a step of kneading the rubber components, the half quantity of silica and the half quantity of the silane coupling agent
Base kneading step 2: a step of kneading the kneaded product obtained in the base kneading step 1 and the remaining silica, silane coupling agent and compounding agents other than a crosslinking agent for at least five minutes until the mixture is brought to a compound temperature at the time of discharge from mixer of 150° C.
Final kneading step: a step of adding the crosslinking agent such as sulfur to the kneaded product obtained in the base kneading steps and kneading the mixture for at least three minutes until the mixture is brought to a compound temperature at the time of discharge from mixer of 105° C.

<Number of Kneading Steps: 4>

After the above base kneading step 2, the following re-kneading step was conducted before the final kneading step.

Base kneading step 1: a step of kneading the rubber components and the half quantity of silica and the half quantity of the silane coupling agent Base kneading step 2: a step of kneading the kneaded product obtained in the base kneading step 1 and the remaining silica, silane coupling agent and compounding agents other than a crosslinking agent for at least five minutes until the mixture is brought to a compound temperature at the time of discharge from mixer of 150° C.

Re-kneading step: a step of kneading the kneaded product, which was obtained in the base kneading step 2 and cooled, for at least three minutes until the mixture is brought to a compound temperature at the time of discharge from mixer of 130° C.

Final kneading step: a step of adding the crosslinking agent such as sulfur to the kneaded product obtained in the base kneading steps and kneading the mixture for at least three minutes until the mixture is brought to a compound temperature at the time of discharge from mixer of 105° C.

Then, the obtained unvulcanized rubber compositions were molded by vulcanization for 12 minutes at 170° C. under a pressure of 25 kgf/cm² to prepare each vulcanized rubber composition. Further, the unvulcanized rubber compositions were molded by extrusion into the shape of the base tread to obtain unvulcanized compositions in the base tread shape and the obtained unvulcanized compositions were laminated with other components of a tire and vulcanized at 170° C. for 12 minutes to produce each tire for test (size: 245/40R18, for passenger cars).

Using the obtained unvulcanized rubber compositions, vulcanized rubber compositions and tires for test, the following evaluations were conducted. The results are shown in Tables 1 to 5.

<Viscoelasticity Test> (Steering Stability and Rolling Resistance)

The complex elastic modulus E* (MPa) and loss tangent tan δ of the vulcanized rubber compositions were measured under a condition at a temperature of 70° C., a frequency of 10 Hz, an initial strain of 10% and a dynamic strain of 2% using a viscoelastic spectrometer VES available from Iwamoto Seisakusho K.K. The larger E* shows the higher hardness and more excellent rigidity and the smaller tan δ shows the lower heat build-up property and more excellent fuel efficiency. From the viewpoint of ride quality performance and steering stability, a target value of E* is 5.9 to 8.0 MPa. Further, from the viewpoint of rolling resistance, a target value of tan δ is not more than 0.095.

<Tensile Test> (EB in the New Condition)

According to JIS K 6251 "Vulcanized Rubber and Thermoplastic Rubber—Method of Obtaining Tensile Characteristics", the elongation at break EB (%) was measured by carrying out a tensile test at room temperature using a No. 3 dumbbell type test piece comprising the vulcanized rubber composition. The larger EB shows the more excellent elongation at break. From the viewpoint of durability, a target value of EB in the new condition is not less than 330.

<Tensile Test> (EB in the Condition after Oxidative Degradation)

According to JIS K 6251 "Vulcanized Rubber and Thermoplastic Rubber—Method of Obtaining Tensile Characteristics", the elongation at break EB (%) was measured by carrying out a tensile test at room temperature using a test piece prepared by subjecting the vulcanized rubber composition to oxidative degradation by airing by allowing the composition to stand at a temperature of 80° C. for 196 hours. The larger EB shows the more excellent elongation at break. From the viewpoint of durability, a target value of EB in the condition after oxidative degradation is not less than 230.

<Extrusion Processability>

Using the unvulcanized rubber compositions for a cap tread, rubber compositions for a base tread (each of the above unvulcanized rubber compositions for testing) and rubber compositions for a wing, extrusion was conducted with a triple tread extruder under a condition such that the temperature of the center of the rubber immediately after the extrusion was 110 to 125° C. The base tread portion after the extrusion was observed by visual evaluation with reference to the presence of scorched crumb, flatness, concavity and convexity of the edge and tackiness. The comprehensive evaluation was shown by index, with defining the extrusion processability of Comparative Example 1 as 100. The larger index shows the more excellent extrusion processability and a target value is not less than 90.

<Durability after Degradation>

The tires for test were put in a dry heat oven and subjected to three-week degradation at 80° C. Then, under the over load condition of 140% with respect to the maximum load of JIS standard (maximum pressure conditions), the running distance of the tires was measured till an abnormality such as an inflation of the tread portion was generated. The index of the running distance of each tire for test was shown with defining the running distance of Comparative Example 1 as 100. The larger index shows the more excellent durability. Additionally, a target value is not less than 105.

TABLE 1

| Compounding amount (part by mass) | EXAMPLE | | | | | | | | |
|---|---|---|---|---|---|---|---|---|---|
| | 1 | 2 | 3 | 4 | 5 | 6 | 7 | 8 | 9 |
| Rubber components | | | | | | | | | |
| (a1) SPB-containing BR | 18 | 18 | 9 | — | 18 | 18 | 18 | 19.9 | 5 |
| (a2) Nd-BR | — | — | — | 18 | — | — | — | — | — |
| (b1) Tin-modified BR | 17 | — | 26 | 17 | 17 | — | — | 5.1 | 25 |
| (b2) S-modified BR | — | 17 | — | — | — | 27 | 27 | — | 30 |
| (c) NR | 65 | 65 | 65 | 65 | 65 | 55 | 55 | 75 | 40 |
| Carbon black | | | | | | | | | |
| N351H | 25 | 25 | 25 | 30 | 35 | 5 | 5 | 25 | 25 |
| N550 | — | — | — | — | — | — | — | — | — |

TABLE 1-continued

| Compounding amount (part by mass) | EXAMPLE | | | | | | | | |
|---|---|---|---|---|---|---|---|---|---|
| | 1 | 2 | 3 | 4 | 5 | 6 | 7 | 8 | 9 |
| Silica | | | | | | | | | |
| VN3 | 30 | 30 | 30 | 25 | 7 | — | — | 30 | 30 |
| U9000Gr | — | — | — | — | — | 40 | 40 | — | — |
| Z1085Gr | — | — | — | — | — | — | — | — | — |
| Total filler | 55 | 55 | 55 | 55 | 42 | 45 | 45 | 55 | 55 |
| Silane coupling agent | | | | | | | | | |
| Si75 | 2.4 | 2.4 | 2.4 | 2 | 0.56 | 4 | — | 2.4 | 2.4 |
| NXT | — | — | — | — | — | — | 4 | — | — |
| Softening agent | | | | | | | | | |
| C5 resin | 2 | 2 | — | — | 2 | 2 | 2 | 2 | 2 |
| TDAE oil | — | — | 2 | 2 | — | — | — | — | — |
| C10 | — | — | — | — | — | — | — | — | — |
| Aid | | | | | | | | | |
| Zinc flower | 5 | 5 | 5 | 5 | 5 | 5 | 5 | 5 | 5 |
| Mold release agent (WB16) | 2 | 2 | 2 | 2 | 2 | 2 | 2 | 2 | 2 |
| Mold release agent (Aflux 16) | — | — | — | — | — | — | — | — | — |
| Stearic acid | 2 | 2 | 2 | 2 | 2 | 2 | 2 | 2 | 2 |
| Wax | 2 | 2 | 2 | 2 | 2 | 2 | 2 | 2 | 2 |
| Anti-aging agent | | | | | | | | | |
| RD | 1 | 1 | 1 | 1 | 1 | 1 | 1 | 1 | 1 |
| 6PPD | 3 | 3 | 3 | 3 | 3 | 3 | 3 | 3 | 3 |
| Crosslinking agent | | | | | | | | | |
| Insoluble sulfur | 2.8 | 2.8 | 2.8 | 2.8 | 2.8 | 2.8 | 2.8 | 2.8 | 2.8 |
| DPG | 1 | 1 | 1 | 1 | 0.2 | 1 | 1 | 1 | 1 |
| CBS | 1.5 | 1.5 | 1.5 | 1.5 | 1.5 | 1.5 | 1.5 | 1.5 | 1.5 |
| Number of kneading steps | 3 | 3 | 3 | 3 | 3 | 3 | 3 | 3 | 3 |
| Evaluation result | | | | | | | | | |
| Complex elastic modulus (E*) | 6.85 | 6.75 | 5.92 | 6.01 | 6.99 | 7.05 | 7.12 | 7.45 | 6.12 |
| Tanδ | 0.073 | 0.079 | 0.062 | 0.071 | 0.094 | 0.066 | 0.054 | 0.093 | 0.064 |
| EB in the new condition | 395 | 405 | 400 | 395 | 355 | 415 | 415 | 445 | 330 |
| EB in the condition after oxidative degradation | 295 | 305 | 305 | 285 | 235 | 325 | 325 | 345 | 230 |
| Extrusion processability | 100 | 100 | 90 | 92 | 105 | 90 | 100 | 115 | 90 |
| Durability after degradation | 130 | 130 | 130 | 120 | 110 | 140 | 150 | 120 | 115 |

TABLE 2

| Compounding amount (part by mass) | EXAMPLE | | | | | | | | | |
|---|---|---|---|---|---|---|---|---|---|---|
| | 10 | 11 | 12 | 13 | 14 | 15 | 16 | 17 | 18 | 19 |
| Rubber components | | | | | | | | | | |
| (a1) SPB-containing BR | 18 | 18 | 18 | 18 | 18 | 18 | 18 | — | 9 | — |
| (a2) Nd-BR | — | — | — | — | — | — | — | 18 | 9 | — |
| (b1) Tin-modified BR | 17 | 17 | 17 | 7 | 17 | 17 | 17 | — | 17 | 17 |
| (b2) S-modified BR | — | — | — | — | — | — | — | 17 | — | 8 |
| (c) NR | 65 | 65 | 65 | 75 | 65 | 65 | 65 | 65 | 65 | 75 |
| Carbon black | | | | | | | | | | |
| N351H | 5 | — | 30 | 20 | 25 | 25 | 25 | 30 | 30 | 28 |
| N550 | — | 20 | — | — | — | — | — | — | — | — |
| Silica | | | | | | | | | | |
| VN3 | — | — | 30 | 25 | 30 | 30 | 30 | 25 | 25 | 30 |
| U9000Gr | 31 | 15 | — | — | — | — | — | — | — | — |
| Z1085Gr | — | 25 | — | — | — | — | — | — | — | — |
| Total filler | 36 | 60 | 60 | 45 | 55 | 55 | 55 | 55 | 55 | 58 |
| Silane coupling agent | | | | | | | | | | |
| Si75 | 3.1 | 3.2 | 2.4 | 2.4 | 2.4 | 2.4 | 2.4 | 2 | 2 | 2.4 |
| NXT | — | — | — | — | — | — | — | — | — | — |

TABLE 2-continued

| Compounding amount (part by mass) | EXAMPLE | | | | | | | | | |
|---|---|---|---|---|---|---|---|---|---|---|
| | 10 | 11 | 12 | 13 | 14 | 15 | 16 | 17 | 18 | 19 |
| Softening agent | | | | | | | | | | |
| C5 resin | 2 | 2 | 2 | 2 | 2 | 2 | 2 | — | — | 2 |
| TDAE oil | — | — | — | — | — | — | — | 2 | 2 | — |
| C10 | — | — | — | — | — | — | — | — | — | — |
| Aid | | | | | | | | | | |
| Zinc flower | 5 | 5 | 5 | 5 | 5 | 5 | 5 | 5 | 5 | 5 |
| Mold release agent (WB16) | 2 | 2 | 2 | 2 | — | 4 | — | 2 | 2 | 2 |
| Mold release agent (Aflux 16) | — | — | — | — | — | — | 2 | — | — | — |
| Stearic acid | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Anti-aging agent | | | | | | | | | | |
| RD | 1 | 1 | 1 | 1 | 1 | 1 | 1 | 1 | 1 | 1 |
| 6PPD | 3 | 3 | 3 | 3 | 3 | 3 | 3 | 3 | 3 | 3 |
| Crosslinking agent | | | | | | | | | | |
| Insoluble sulfur | 2.8 | 2.8 | 2.02 | 3.88 | 2.8 | 2.8 | 2.8 | 2.8 | 2.8 | 2.8 |
| DPG | 1 | 1 | 1 | 1 | 1 | 1 | 1 | 1 | 1 | 1 |
| CBS | 1.5 | 1.5 | 2.2 | 0.8 | 1.5 | 1.5 | 1.5 | 1.5 | 1.5 | 1.5 |
| Number of kneading steps | 3 | 3 | 3 | 3 | 3 | 3 | 3 | 3 | 3 | 3 |
| Evaluation result | | | | | | | | | | |
| Complex elastic modulus (E*) | 5.92 | 7.05 | 6.45 | 7.03 | 7.05 | 6.7 | 6.94 | 6.05 | 6.32 | 6.05 |
| Tanδ | 0.068 | 0.094 | 0.093 | 0.085 | 0.072 | 0.075 | 0.071 | 0.074 | 0.072 | 0.066 |
| EB in the new condition | 435 | 410 | 435 | 365 | 400 | 390 | 395 | 415 | 400 | 405 |
| EB in the condition after oxidative degradation | 325 | 310 | 355 | 230 | 305 | 285 | 290 | 305 | 280 | 270 |
| Extrusion processability | 90 | 95 | 95 | 110 | 90 | 115 | 95 | 100 | 92 | 100 |
| Durability after degradation | 140 | 115 | 115 | 115 | 130 | 125 | 130 | 125 | 120 | 120 |

TABLE 3

| Compounding amount (part by mass) | EXAMPLE | | | | | |
|---|---|---|---|---|---|---|
| | 20 | 21 | 22 | 23 | 24 | 25 |
| Rubber components | | | | | | |
| (a1) SPB-containing BR | 18 | 18 | 18 | 18 | 18 | 18 |
| (b1) Tin-modified BR | 17 | 17 | — | — | 17 | 17 |
| (b2) S-modified BR | — | — | 27 | 27 | — | — |
| (c) NR | 65 | 65 | 55 | 55 | 65 | 65 |
| Carbon black | | | | | | |
| N351H | 25 | 25 | 5 | 5 | 25 | 25 |
| N550 | — | — | — | — | — | — |
| Silica | | | | | | |
| VN3 | 30 | 30 | — | — | 30 | 30 |
| U9000Gr | — | — | 40 | 40 | — | — |
| Z1085Gr | — | — | — | — | — | — |
| Total filler | 55 | 55 | 45 | 45 | 55 | 55 |
| Silane coupling agent | | | | | | |
| Si75 | 2.4 | 2.4 | — | — | 2.4 | — |
| NXT | — | — | 4 | 4 | — | 3 |
| Softening agent | | | | | | |
| C5 resin | 2 | 2 | 2 | 2 | — | — |
| TDAE oil | — | — | — | — | — | — |
| C10 | — | — | — | — | 4 | 4 |
| Aid | | | | | | |
| Zinc flower | 5 | 5 | 5 | 5 | 5 | 5 |
| Mold release agent (WB16) | 2 | 2 | 3 | 2 | 2 | 2 |
| Mold release agent (Aflux 16) | — | — | — | — | — | — |
| Stearic acid | 2 | 2 | 3 | 2 | 2 | 2 |
| Wax | 2 | 2 | 2 | 2 | 2 | 2 |

TABLE 3-continued

| Compounding amount (part by mass) | EXAMPLE | | | | | |
|---|---|---|---|---|---|---|
| | 20 | 21 | 22 | 23 | 24 | 25 |
| Anti-aging agent | | | | | | |
| RD | 1 | 1 | 1 | 1 | 1 | 1 |
| 6PPD | 3 | 3 | 3 | 3 | 3 | 3 |
| Crosslinking agent | | | | | | |
| Insoluble sulfur | 2.8 | 2.8 | 2.8 | 2.8 | 2.8 | 2.8 |
| DPG | 1 | 1 | 1 | 1 | 1 | 1 |
| CBS | 1.5 | 1.5 | 1.5 | 1.5 | 1.5 | 1.5 |
| Number of kneading steps | 2 | 4 | 2 | 4 | 3 | 3 |
| Evaluation result | | | | | | |
| Complex elastic modulus (E*) | 7.21 | 6.55 | 7.55 | 6.85 | 6.88 | 6.94 |
| Tanδ | 0.094 | 0.067 | 0.075 | 0.048 | 0.064 | 0.055 |
| EB in the new condition | 340 | 425 | 355 | 445 | 425 | 420 |
| EB in the condition after oxidative degradation | 235 | 315 | 265 | 360 | 335 | 335 |
| Extrusion processability | 105 | 105 | 90 | 105 | 105 | 110 |
| Durability after degradation | 115 | 135 | 120 | 160 | 140 | 150 |

TABLE 4

| Compounding amount (part by mass) | COMPARATIVE EXAMPLE | | | | | | |
|---|---|---|---|---|---|---|---|
| | 1 | 2 | 3 | 4 | 5 | 6 | 7 |
| Rubber components | | | | | | | |
| (a1) SPB-containing BR | 30 | 30 | 30 | 18 | 18 | 18 | 18 |
| (b1) Tin-modified BR | 20 | 20 | — | 3 | 65 | 17 | 7 |
| (b2) S-modified BR | — | — | 20 | — | — | — | — |
| (c) NR | 50 | 50 | 50 | 79 | 17 | 65 | 75 |
| Carbon black | | | | | | | |
| N351H | 37 | 25 | 25 | 25 | 25 | 30 | 20 |
| N550 | — | — | — | — | — | — | — |
| Silica | | | | | | | |
| VN3 | — | 30 | 30 | 30 | 30 | 30 | 25 |
| U9000Gr | — | — | — | — | — | — | — |
| Z1085Gr | — | — | — | — | — | — | — |
| Total filler | 37 | 55 | 55 | 55 | 55 | 60 | 45 |
| Silane coupling agent | | | | | | | |
| Si75 | — | 2.4 | 2.4 | 2.4 | 2.4 | 2.4 | 2 |
| NXT | — | — | — | — | — | — | — |
| Softening agent | | | | | | | |
| C5 resin | 2 | 2 | 2 | 2 | 2 | 2 | 2 |
| TDAE oil | — | — | — | — | — | — | — |
| C10 | — | — | — | — | — | — | — |
| Aid | | | | | | | |
| Zinc flower | 5 | 5 | 5 | 5 | 5 | 5 | 5 |
| Mold release agent (WB16) | 2 | 2 | 2 | 2 | 2 | 2 | 2 |
| Mold release agent (Aflux 16) | — | — | — | — | — | — | — |
| Stearic acid | 2 | 2 | 2 | 2 | 2 | 2 | 2 |
| Wax | 2 | 2 | 2 | 2 | 2 | 2 | 2 |
| Anti-aging agent | | | | | | | |
| RD | 1 | 1 | 1 | 1 | 1 | 1 | 1 |
| 6PPD | 3 | 3 | 3 | 3 | 3 | 3 | 3 |
| Crosslinking agent | | | | | | | |
| Insoluble sulfur | 3.0 | 2.8 | 2.8 | 2.8 | 2.8 | 1.9 | 4 |
| DPG | — | 1 | 1 | 1 | 1 | 1 | 1 |
| CBS | 1.5 | 1.5 | 1.5 | 1.5 | 1.5 | 2.5 | 0.6 |
| Number of kneading steps | 2 | 3 | 3 | 3 | 3 | 3 | 3 |
| Evaluation result | | | | | | | |
| Complex elastic modulus (E*) | 5.95 | 7.15 | 7.25 | 7.45 | 6.02 | 5.95 | 6.98 |
| Tanδ | 0.097 | 0.082 | 0.087 | 0.12 | 0.051 | 0.11 | 0.098 |

TABLE 4-continued

| Compounding amount (part by mass) | COMPARATIVE EXAMPLE ||||||| 
| --- | --- | --- | --- | --- | --- | --- | --- |
| | 1 | 2 | 3 | 4 | 5 | 6 | 7 |
| EB in the new condition | 295 | 285 | 300 | 425 | 315 | 455 | 365 |
| EB in the condition after oxidative degradation | 175 | 165 | 175 | 315 | 145 | 375 | 175 |
| Extrusion processability | 100 | 100 | 100 | 110 | 50 | 95 | 110 |
| Durability after degradation | 100 | 95 | 95 | 90 | 60 | 105 | 85 |

TABLE 5

| Compounding amount (part by mass) | COMPARATIVE EXAMPLE ||||||
| --- | --- | --- | --- | --- | --- | --- |
| | 8 | 9 | 10 | 11 | 12 | 13 |
| Rubber components | | | | | | |
| (a1) SPB-containing BR | 18 | 18 | 18 | 18 | 30 | 30 |
| (b1) Tin-modified BR | 17 | 17 | 17 | 17 | 20 | 20 |
| (b2) S-modified BR | — | — | — | — | — | — |
| (c) NR | 65 | 65 | 65 | 65 | 50 | 50 |
| Carbon black | | | | | | |
| N351H | 37 | — | 5 | 33 | 37 | 25 |
| N550 | — | 25 | — | — | — | — |
| Silica | | | | | | |
| VN3 | 5 | — | — | — | — | 30 |
| U9000Gr | — | 15 | 28 | — | — | — |
| Z1085Gr | — | 25 | — | — | — | — |
| Total filler | 42 | 65 | 33 | 33 | 37 | 55 |
| Silane coupling agent | | | | | | |
| Si75 | — | 3.2 | 2.8 | — | — | 2.4 |
| NXT | — | — | — | — | — | — |
| Softening agent | | | | | | |
| C5 resin | 2 | 2 | 2 | 2 | 2 | 2 |
| TDAE oil | — | — | — | — | — | — |
| C10 | — | — | — | — | — | — |
| Aid | | | | | | |
| Zinc flower | 5 | 5 | 5 | 5 | 5 | 5 |
| Mold release agent (WB16) | 2 | 2 | 2 | 2 | 2 | 2 |
| Mold release agent (Aflux 16) | — | — | — | — | — | — |
| Stearic acid | 2 | 2 | 2 | 2 | 2 | 2 |
| Wax | 2 | 2 | 2 | 2 | 2 | 2 |
| Anti-aging agent | | | | | | |
| RD | 1 | 1 | 1 | 1 | 1 | 1 |
| 6PPD | 3 | 3 | 3 | 3 | 3 | 3 |
| Crosslinking agent | | | | | | |
| Insoluble sulfur | 2.8 | 2.8 | 3.5 | 3.5 | 3.0 | 2.8 |
| DPG | 0.2 | 1 | 1 | — | — | 1 |
| CBS | 1.5 | 1.2 | 1.5 | 1.5 | 1.5 | 1.5 |
| Number of kneading steps | 3 | 3 | 3 | 2 | 3 | 4 |
| Evaluation result | | | | | | |
| Complex elastic modulus (E*) | 7.12 | 6.98 | 5.95 | 5.97 | 5.88 | 6.85 |
| Tanδ | 0.099 | 0.118 | 0.067 | 0.085 | 0.096 | 0.078 |
| EB in the new condition | 335 | 420 | 405 | 275 | 305 | 305 |
| EB in the condition after oxidative degradation | 205 | 315 | 315 | 160 | 170 | 160 |
| Extrusion processability | 110 | 75 | 70 | 80 | 100 | 100 |
| Durability after degradation | 90 | 80 | 125 | 80 | 100 | 95 |

From the results shown in Tables 1 to 5, it can be found that a rubber composition for a base tread which can improve steering stability, rolling resistance and durability without deteriorating extrusion processability can be obtained when the rubber composition comprises a predetermined rubber component, sulfur and a predetermined filler for reinforcement in predetermined amounts.

What is claimed is:
1. A base tread rubber composition, wherein the rubber composition comprises:

1.8 to 3.5 parts by mass of sulfur, 38 to 60 parts by mass of a filler for reinforcement consisting essentially of 7 to 55 parts by mass of silica with a BET specific surface area of 50 to 300 $m^2/g$ and 5 to 40 parts by mass of carbon black with a BET specific surface area of 30 to 100 $m^2/g$, 1.0 to 3.0 parts by mass of stearic acid, 1.0 to 5.0 parts by mass of a mold release agent which is at least one member selected from the group consisting of a metal salt of a fatty acid, a fatty acid amide and an amide ester, 0.1 to 3.0 parts by mass of diphenylguanidine, and a rubber component, wherein the above parts by mass ranges are based on 100 parts by mass of the rubber component which comprises diene rubbers (a), (b) and (c) as follows:

(a) greater than or 0% by mass and less than 20% by mass of
   (a1) a polybutadiene rubber comprising 2.5 to 20% by mass of 1,2-syndiotactic polybutadiene crystal (b) more than 5% by mass and not more than 60% by mass of
   (b1) a tin-modified polybutadiene rubber prepared with a lithium initiator and having a content of tin atoms of 50 to 3,000 ppm, a vinyl bond amount of 5 to 50% by mass and a molecular weight distribution (Mw/Mn) of not more than 2.0; and (c) 40 to 75% by mass of a diene rubber other than (a) and (b).

2. The base tread rubber composition of claim 1, wherein the content of diene rubber (a) is greater than or equal to 10% by mass and less than 20% by mass and the content of diene rubber (b) is more than 5% by mass and less than or equal to 50% by mass.

3. The base tread rubber composition of claim 1, wherein the filler for reinforcement is 45 to 60 parts by mass and consists essentially of 25 to 55 parts by mass of silica with a BET specific surface area of 50 to 300 $m^2/g$ and 5 to 40 parts by mass of carbon black with a BET specific surface area of 68 to 100 $m^2/g$.

4. The base tread rubber composition of claim 1, wherein diene rubber (a) is diene rubber (a1) and a butadiene rubber synthesized with a rare earth containing catalyst.

5. The base tread rubber composition of claim 1, wherein the rubber composition is produced with a production method including three or more kneading steps comprising a base kneading step 1, a base kneading step 2, and a final kneading step.

6. The base tread rubber composition of claim 2, wherein the rubber composition is produced with a production method including three or more kneading steps comprising a base kneading step 1, a base kneading step 2, and a final kneading step.

7. A tire having a base tread formed from the rubber composition of claim 1.

8. A tire having a base tread formed from the rubber composition of claim 2.

* * * * *